United States Patent [19]

Fernandes

[11] 4,346,317

[45] Aug. 24, 1982

[54] GASIFIED COAL-FIRED SYSTEM

[75] Inventor: John H. Fernandes, Windsor, Conn.

[73] Assignee: Combustion Engineering, Inc., Windsor, Conn.

[21] Appl. No.: 179,326

[22] Filed: Aug. 18, 1980

[51] Int. Cl.³ .............................................. H02N 4/02
[52] U.S. Cl. .................................... 310/11; 48/197 R
[58] Field of Search ........................................... 310/11

[56] References Cited

U.S. PATENT DOCUMENTS 3,920,417  11/1975  Fernandes .......................... 48/200 X
4,282,449   8/1981  Bozzuto ................................. 310/11

Primary Examiner—Donovan F. Duggan
Attorney, Agent, or Firm—Arthur L. Wade

[57] ABSTRACT

A downflow coal gasifier, supplied lime/limestone with the coal, removes sulfur and obviates the production of particulate matter in generating a clean, low BTU gas for the combustor of an MHD channel. Air for both the combustor of the MHD channel and the gasifier is heated by the discharged fluids from the channel.

3 Claims, 1 Drawing Figure

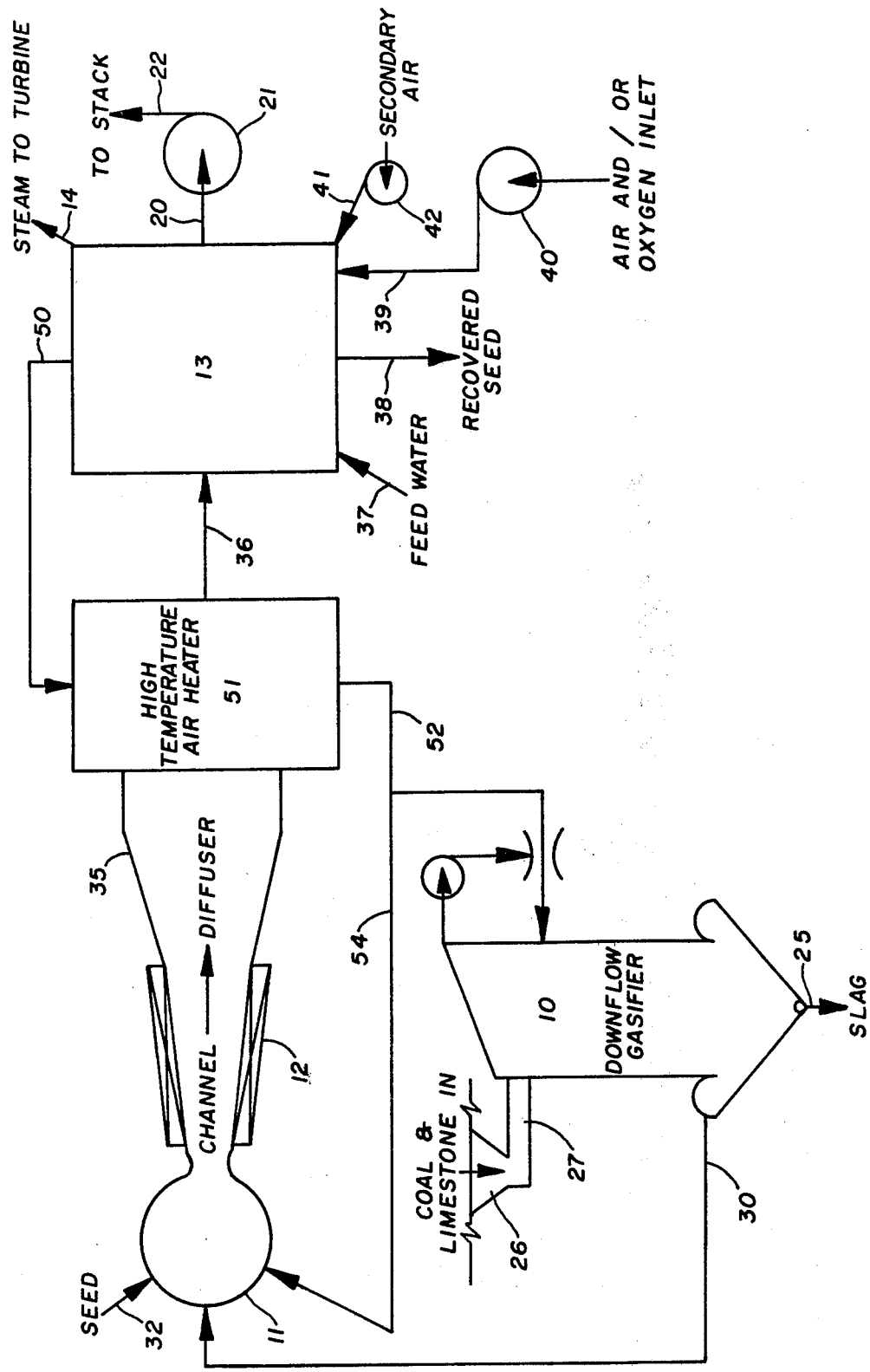

GASIFIED COAL-FIRED SYSTEM

TECHNICAL FIELD

The present invention relates to the supply of gasified coal to a magnetohydrodynamic (MHD) generator of electric power. More particularly, the invention relates to gasifying coal while reducing the particulate and sulfur content of the low BTU gas and using the heat of the fluid output of an MHD channel, supplied by combusting the low BTU gas, to elevate the temperature of the air for both the channel combustor and the gasifier.

BACKGROUND ART

The MHD generator is well established in theory and practice as utilizing high temperature, high velocity, ionized fluid to generate electric power as the fluid is directed through a static magnetic field. Practicality dictates a temperature range for the gases of at least 4000 F. Potassium compounds, referred to as "seed," are injected into the combustion chamber for enhancing the ionization of the fluid flowing through the MHD channel.

If an ample supply of clean fuel, such as gas and oil, is available and the combustion air can be brought up to a temperature of at least 2500 F., the resulting gaseous products of combustion after traversing the channel are ejected from the MHD channel and subsequently utilized to convert water to steam. The steam can then be used to power a turbine which is coupled to an electric generator. The total electric power generated by the MHD channel and steam cycle can then be compared to the energy input to the system to obtain an efficiency of approximately 50%.

Coals is in abundant supply and it is, therefore, desirable that its energy be made available to the MHD generator. There are various systems for converting solid coal into relatively low BTU content gas for the MHD generator combustor. Unfortunately, coal-to-gas conversion runs into the vicious problem of compensating for the high ash and sulfur content of this form of fossil fuel. The ash is a polluting solid particulate in the final discharge to the atmosphere. Sulfur compounds may also be discharged to the atmosphere, as at least noxious pollutants, if not corrosive and poisonous threats to the environment.

The present problem must be solved with a system which provides gasification of coal while reducing the particulate material and sulfur content of the gas to an acceptable level. Further, the combustion air required for the burning of the coal gas and its gasification must be heated by the discharge of the products of combustion from the MHD channel. Briefly, pollution to the environment is controlled and heat energy is conserved.

DISCLOSURE OF THE INVENTION

The present invention contemplates supplying fuel gas to an MHD channel from a downflow coal gasifier, fed a combination of coal and lime/limestone, burned sub-stoichiometrically, to produce a slag containing the sulfur of the coal and solid particulate while combustion air for the MHD combustor is heated in an exchanger in the vapor output of the MHD diffuser. Further, the invention contemplates the air for producing the coal gas has its temperature, also, elevated by exchange with the fluid products of combustion from the MHD channel, itself.

Other objects, advantages, and features of the invention will become apparent to one skilled in the art upon consideration of the written specification, appended claims and accompanying drawing.

BRIEF DESCRIPTION OF THE DRAWING

The FIGURE is a flow diagram of the fluids flowing between and through the components of a power generating system as contemplated in the present invention.

BEST MODE FOR CARRYING OUT THE INVENTION

Broadly Speaking

The end function of the system depicted in the drawing is to gasify coal in tower 10 and supply this fuel as a clean, low BTU gas to combustor 11 of MHD channel 12. Electrical energy will be generated by the channel 12 and the gaseous products of combustion from the combustor 11 will be discharged to a steam generator 13. The steam generated at 13 will be discharged at 14 and be utilized in a turbine-electric generator connected to conduit 14 to produce additional electrical energy. Therefore, the end result of the system is to convert the energy in coal to electrical energy with an efficiency of approximately 50%.

The Sulfur Problem and Solution

One of the problems faced by the present invention is to control the amount of sulfur compounds ultimately discharged to the atmosphere. Conduit 20 represents the means for withdrawing the exhaust gases from generator 13 by fan 21 and delivering them to a stack by way of conduit 22. Sulfur compounds, which have their origin in the coal, are removed from the process by their discharge through conduit 25 which forms an exit from the lower portion of gasifier tower 10. Coal is supplied to the gasifier from a storage 26. The coal is mixed with lime/limestone and this mixture supplied through conduit 27 connected between the storage and upper portion of the tower 10. The coal is burned with heated air under sub-stoichiometric conditions in the upper portion of tower 10, the lime/limestone combining with the sulfur compounds of the coal and forming part of the slag removed through conduit 25.

The low BTU gaseous product of the coal is flowed from the lower portion of tower 10 through conduit 30. This low BTU (circa 150 BTU/cu. ft.) gas is supplied combustor 11. Thus, the sulfur contaminant and particulate matter is reduced at this early stage within the system disclosed, and the final discharge to the stack through conduit 22 will meet present environmental standards.

The Coal Gasifier

The structure depicted as within tower 10 is a vital element of the embodiment of the present invention, if not its raison d'etre. This unique structure provides its clean fuel gas product by downflowing the coal and lime/limestone and combustion air supplied the upper portion of tower 10. The details of the structure needed to carry out the sub-stoichiometric combustion and formation of sulfur and particulate absorption slag is disclosed in U.S. Fernandes' U.S. Pat. No. 3,920,417 issued Nov. 18, 1975. The disclosure of this patent is incorporated and made a part of this present disclosure by reference. The operation and structural arrangement of this unit within tower 10 is to be in accordance with the teachings of this patent disclosure. To incorporate this disclosure, the present invention concerns itself only with the facts that the lime/limestone and coal of source 26 and heated combustion air are supplied the upper portion of tower 10 while slag and clean coal gas are removed from the lower portion of tower 10.

Heating Combustion Air

The generation of gaseous fluid as a product of combustion within 11 is well developed in the art. The combustion is controlled to produce a gaseous fluid with a temperature of at least 4000 F. for high velocity flow through channel 12. To reach this temperature, it is necessary that the combustion air supplied combustor 11 be preheated to a temperature which will insure the ionization of the fluid discharged through channel 12. Of course, the flame temperature within the combustor 11 may be elevated by supplementing the heat to its combustion air with oxygen enrichment. The combination of heat and oxygen to the combustion air is grist for the economic mill with which the complete system is engineered.

Further, seed, in the form of potassium sulfide or potassium carbonate, is introduced from a supply through conduit 32 connected to the combustor. For economic reasons, this expensive material is recovered downstream of the channel and recycled. The seed is vaporized to pass through channel 12 and subsequently condensed at the lower downstream temperatures. The present invention is not directly concerned with the mechanics of cooling the condensed seed and recycling it to the combustor. However, it is recognized that a cyclone operating at temperatures as high as 2000 F., or granular filters, may be employed in the recovery cycle.

The high temperature, ionized, gaseous fluid discharged from channel 12 flows through diffuser 35. A conduit 36 represents the path for this fluid into vapor generator 13. The complication of heat exchange surfaces between this gaseous fluid and water to generate steam need not be shown. It is sufficient to indicate that feed water flows into this generator 13 from a source through conduit 37 and emerges as steam through conduit 14. Additionally, the seed introduced through conduit 32 is condensed and collected within generator 13 and extracted through conduit 38.

The gaseous fluid from the MHD generator flowing into steam generator 13 through conduit 36 may have its heat supplemented by burners within the generator 13. The provision for supplemental burners is additionally indicated by conduit 41 supplying secondary air for the burner operation with fan 42. Whatever the specific arrangement for extracting heat from the fluid output of the MHD channel and burners, there is included, heat exchange surfaces for transfer of a part of this heat to air conducted through conduit 39 by compressor 40. The heating of this air within generator 13 is continued by conducting it through conduit 50 and passing it through exchanger 51.

There is invention in the system for supplying the combustion air for combustor 11 and the sub-stoichiometric combustion in tower 10. The air in conduit 52 is supplied for both uses. It has been conventional to heat the air for these services by an independently-fired preheater. However, in the present invention, sufficient heat is supplied to the air in conduit 50 by heat exchanger 51. Heat exchanger 51 is placed at the output of diffuser 35. The technology of heat exchangers has evolved until the heat exchanger 51 has a practical form for exposure to the high temperature gaseous output of channel 12. It is now practical for the air passed through conduit 50 to be flowed through exchanger 51 and have its temperature elevated to at least 2000 F. Output conduit 52 of exchanger 51 is then connected to first branch 53, conduit 53 conducting the portion of the air needed for the sub-stoichiometric combustion in tower 10. Branch conduit 54 concomitantly conducts its portion of the air from conduit 52 to combustor 11. As indicated previously, the combustion air in conduit 54 may have its oxygen content elevated as a supplement to its heating by exhanger 51. This provision is not shown, but is a well-known arrangement for control of the flame temperature within combustor 11.

Conclusion

The present embodiment extracts the energy of coal and converts it to electrical energy. In carrying out this conversion, sulfur, which is found in most coal supplies, is quickly removed in a gasifier 10 as a component of the slag removed through conduit 25. This early removal of the sulfur solves problems downstream. The combination of the sulfur with the potassium seed material is obviated and its subsequent removal from the discharge gases of the stack through conduit 22 is avoided.

The present system eliminates the need for an independently-fired preheater of the combustion air to combustor 11 and tower 10. The necessary heat is extracted from the working fluid discharged from channel 12. Heat exchanger 51 can be given the practical form for this heat transfer and thereby eliminate the complication of a separately-fired preheater.

From the foregoing, it will be seen that this invention is one well adapted to attain all of the ends and objects hereinabove set forth, together with other advantages which are obvious and inherent to the apparatus.

It will be understood that certain features and subcombinations are of utility and may be employed without reference to other features and subcombinations. This is contemplated by and is within the scope of the invention.

As many possible embodiments may be made of the invention without departing from the scope thereof, it is to be understood that all matter herein set forth, or shown in the accompanying drawing, is to be interpreted in an illustrative and not in a limiting sense.

The invention having been described, what is claimed is:

1. A system for generating electrical power from the combustion of coal and air, comprising,
    an MHD channel having a combustor to which fuel and air are supplied for combustion,
    a coal-gasifier connected to the combustor as the source of fuel,
    a source of coal and lime/limestone connected to the gasifier within which the coal is converted to gaseous fuel for the combustor and from which slag is produced containing sulfur from the coal and particulate matter,
    a vapor generator connected to the output of the channel to receive its products of combustion and transfer their heat to water in converting the water to steam,
    a steam turbine and electric generator connected to the steam output of the vapor generator to convert the steam energy into electrical energy, a source of combustion air connected to the vapor generator to transfer heat from the products of combustion to the combustion air, a heat exchanger connected between the channel and vapor generator and combustion air outlet of the vapor generator to transfer heat from the products of combustion from the channel to the combustion air heated by the vapor generator, and a connection between the heat exchanger and the combustor to supply the heated combustion air to the combustor in support of the combustion of the fuel supplied by the gasifier.

2. The system of claim 2 in which the gasifier is of the form disclosed in U.S. Pat. No. 3,920,417.

3. The system of claim 3, including, a connection between the heat exchanger and the gasifier to supply air for the sub-stoichiometric combustion within the gasifier.

* * * * *